United States Patent
Mundt et al.

(10) Patent No.: US 9,251,859 B2
(45) Date of Patent: Feb. 2, 2016

(54) DRIVE VIBRATION PREVENTION SYSTEM

(75) Inventors: Kevin Mundt, Austin, TX (US); Frank Widjaja Yu, Austin, TX (US)

(73) Assignee: Dell Products L.P., Round Rock, TX (US)

(*) Notice: Subject to any disclaimer, the term of this patent is extended or adjusted under 35 U.S.C. 154(b) by 700 days.

(21) Appl. No.: 13/481,354

(22) Filed: May 25, 2012

(65) Prior Publication Data
US 2013/0317657 A1    Nov. 28, 2013

(51) Int. Cl.
G05B 13/02    (2006.01)
G11B 33/08    (2006.01)
G05B 5/01     (2006.01)

(52) U.S. Cl.
CPC . *G11B 33/08* (2013.01); *G05B 5/01* (2013.01)

(58) Field of Classification Search
None
See application file for complete search history.

(56) References Cited

U.S. PATENT DOCUMENTS

| | | | |
|---|---|---|---|
| 6,633,454 B1 * | 10/2003 | Martin et al. | 360/132 |
| 6,732,267 B1 * | 5/2004 | Wu et al. | 713/100 |
| 7,761,244 B2 * | 7/2010 | Gross et al. | 702/34 |
| 8,681,440 B1 * | 3/2014 | Theimer et al. | 360/39 |
| 2008/0071393 A1 * | 3/2008 | Cagno et al. | 700/28 |
| 2009/0015241 A1 | 1/2009 | Gross et al. | |
| 2010/0024555 A1 | 2/2010 | Gross et al. | |

\* cited by examiner

*Primary Examiner* — Sean Shechtman
(74) *Attorney, Agent, or Firm* — Haynes and Boone, LLP (57) ABSTRACT

A drive vibration prevention system includes a fan and a drive. The drive includes a vibration detection device and a vibration notification pin. A management engine is coupled to the drive and the fan. The management engine is operable to determine whether the vibration notification pin is being asserted in response to the vibration detection device detecting a vibration that exceeds a predetermined threshold. In response to determining that the vibration notification pin is being asserted, the management engine retrieves vibration data from the drive. The management engine then modifies a fan speed of the fan using the vibration data. Drives may be grouped into drive groups that output a single vibration notification signal to the management engine, and in response to the assertion of a vibration notification pin in the drive group, the management engine retrieves vibration data from each of the drives in that drive group.

20 Claims, 5 Drawing Sheets

DRIVE VIBRATION PREVENTION SYSTEM

BACKGROUND

The present disclosure relates generally to information handling systems, and more particularly to system for preventing vibration in one or more drives of an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Many IHS's include IHS components that may operate by themselves or together to produce vibrations in the IHS, and those vibrations can sometimes operate to interfere with the IHS components. For example, most IHS's include drives such as, for example, hard disk drives (HDD's) for storing data used by the IHS, along with fans for cooling the IHS. As is known in the art, HDD's include drive platters that rotate in order to allow the drive platter to be read by a drive head. In some situations, operation of the fans to cool the IHS can induce rotational vibrations in the HDD's that can cause the drive head in an HDD to track poorly (e.g., become misaligned with the data track on the drive platter) and even engage the drive platter, which can damage the HDD and/or result in a loss of data. For example, fans in an IHS are typically operated at a minimum fan speed necessary to cool the IHS components, and as ambient temperatures and IHS loads increase, the speed of the fans is increased to provide more cooling. It is common that, at certain fan speeds (e.g., when the resonance frequencies of the drive and fans match), problematic rotational vibrations will be induced in the HDD's and cause the issues discussed above.

One solution to this problem is to monitor the rotational vibration in the HDD and, when the rotational vibration gets to a problematic level, attempt to maintain the drive head tracking by decreasing the data throughput rate on the HDD and/or increasing the current that controls the drive head in order to stabilize the drive head. Another solution to this problem is to test IHSs in a lab through their range of fan speeds to determine which fan speed ranges cause a data throughput reduction. For fan speed ranges that cause a data throughput reduction, HDD rotational vibration issues may then be assumed at those fan speed ranges, and the fan control system in the IHS may then be programmed to "step over" or bypass those fan speed ranges (also known as "notching" the fan speed curve.)

These conventional solutions suffer from a number of issues. For example, increasing fan speeds past problematic fan speed ranges will increase the noise produced by the IHS, and thus when the problematic fan speed range is inaccurately large, the IHS produces more noise than is necessary to prevent problematic HDD vibrations. Furthermore, reducing data throughput is undesirable, as it slows IHS operation. Further still, the lab testing discussed above either requires that testing be conducted for each IHS chassis type, or that an assumption be made that all IHS chassis types behave the same, and also assumes that the lab environment is similar to the environment in which the IHS will be used. However, as is known in the art, placing a mass (e.g., a book, another chassis, etc.) on top of an IHS chassis can change the resonance frequency of the IHS chassis and can cause a shift in the fan speed ranges at which problematic rotational vibrations are induced in the HDD's. Furthermore, different HDD models from different manufacturers have different chassis resonant frequencies and will experience problematic rotational vibrations at different fan speed ranges, and thus a "notched" fan speed curve for an IHS chassis with HDD's from a first manufacturer may produce problematic rotational vibrations in the IHS chassis using HDD's from a second manufacturer.

Accordingly, it would be desirable to provide an improved drive vibration prevention system.

SUMMARY

According to one embodiment, a drive vibration prevention system includes a fan connector that is operable to connect to a fan; a drive connector that is operable to connect to a drive, wherein the drive connector includes a vibration notification pin connection; and a management engine that is coupled to the drive connector and the fan connector, wherein the management engine is operable to: determine whether a vibration notification pin is being asserted through the vibration pin connection; retrieve vibration data through the drive connector in response to determining that the vibration notification pin is being asserted; and provide a signal through the fan connector for modifying a fan speed using the vibration data.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
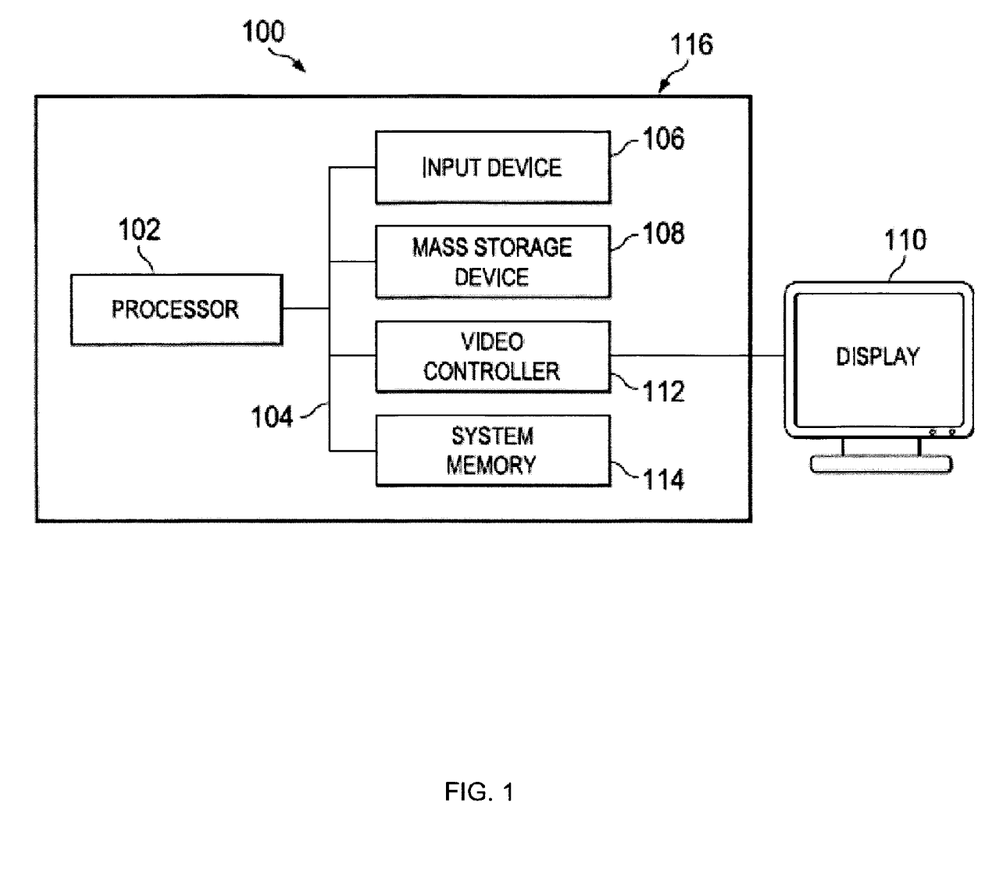
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
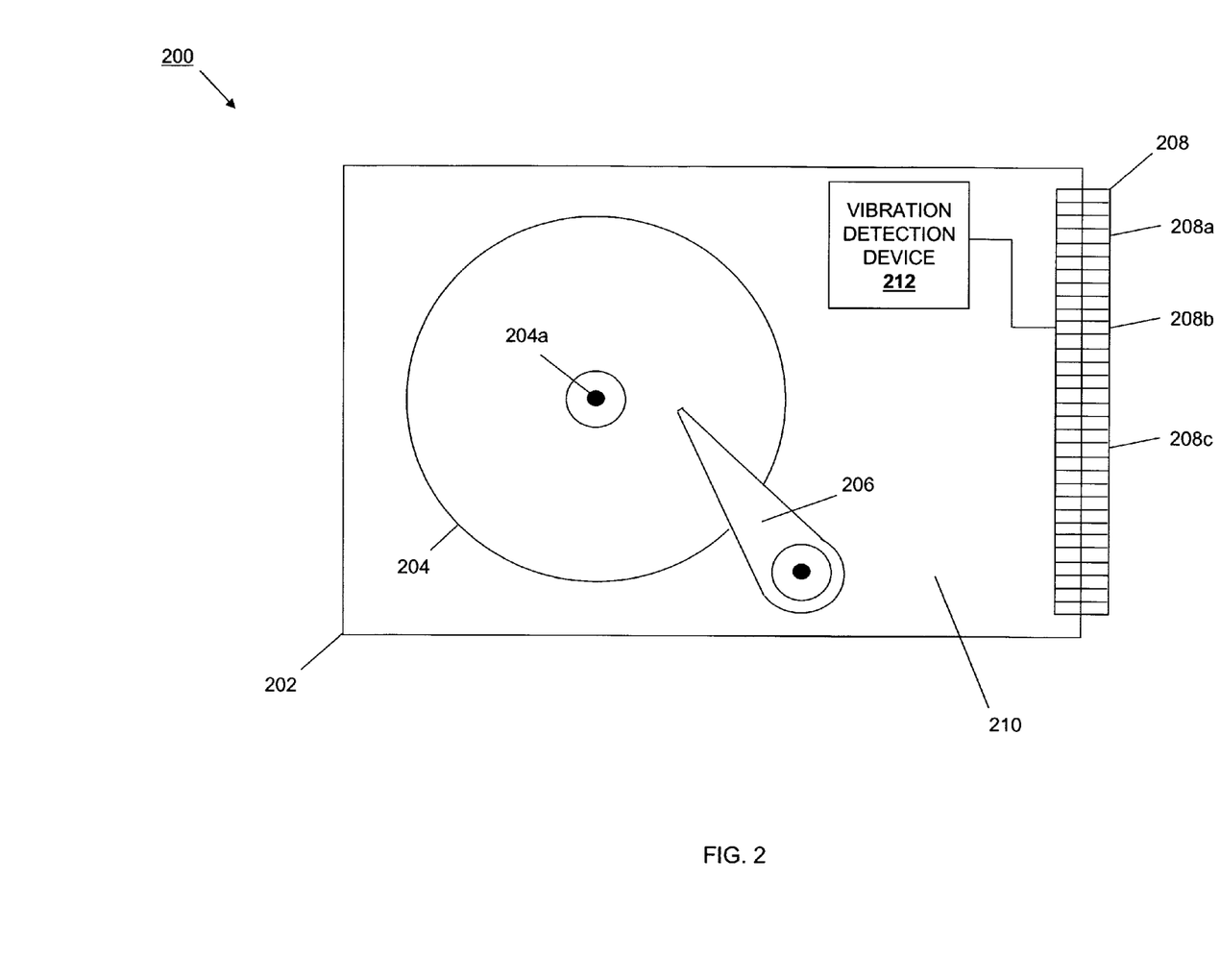
FIG. 2 is a schematic view illustrating an embodiment of a drive.

Referring now to FIG. 2, an embodiment of a drive 200 is illustrated. In an embodiment, the drive 200 may be the storage device 108, discussed above with reference to FIG. 1. In the embodiment of FIG. 2, the drive 200 is illustrated and described as a hard disk drive. However, one of skill in the art will recognize that a variety of other drives and/or IHS components that are subject to problematic vibrations will fall within the scope of the present disclosure. The drive 200 includes a drive chassis 202 that houses a drive platter 204 and a drive head 206. As is known in the art, the drive platter 204 rotates about an axis 204a and the drive head 206 rotates about an axis 206a such that data can be read off the drive platter 204 using the drive head 206. A connector member 208 is coupled to a circuit board 210 that is housed in the drive chassis 202. The connector member 208 includes a plurality of a pins (e.g., the pins 208a, 208b, and 208c are examples) that are coupled to the circuit board 210 and accessible from outside the drive chassis 202. In an embodiment, one or more of the pins may include a General Purpose Input/Output (GPIO) pin. A vibration detection device 212 is housed in the chassis 202 (e.g., located on the circuit board 210) and coupled to one of the pins (e.g., the pin 208b through the circuit board 210 in the illustrated embodiment) on the connector member 208. In an embodiment, the vibration detection device 212 may include one or more accelerometers, velocity pickups, eddy probes, combinations thereof, and/or a variety of other vibration detection and measurement devices known in the art. Furthermore, the vibration detection device 212 may include or be coupled to a memory for storing data. While not illustrated for clarity, one of skill in the art will recognize that a variety of other drive components may be housed in the chassis and/or coupled to the circuit board 210, and the circuit board 210 may provide connections between any of the drive components of the drive 200 (e.g., the vibration detection device 212 may be coupled to a processor (not illustrated) on the circuit board 210 that is further coupled to the drive platter 204 and drive head 206.)

In an embodiment, the vibration detection device 212 is coupled to the pin 208b, and the pin 208b is provided for, and has been repurposed to provide, a vibration notification pin. As discussed in further detail below, the vibration notification pin provides an out-of-band method for notifying the management engine that vibrations in the drive 200 have exceeded a predetermined threshold. In an embodiment, the drive 200 may be a Serial Attached SCSI (Small Computer Systems Interface) (SAS) drive or a Serial Advanced Technology Attachment (SATA) drive. According to the SAS and SATA specifications, drive activity is reported using a drive activity LED through pin 11 of the connector member 208 on the drive 200. In some embodiments of the present disclosure, pin 11 of the connector member 208 on the drive 200 may be repurposed by modifying the firmware for the drive 200 such that pin 11 may be asserted in response to detecting a vibration that exceeds a predetermined threshold. In some embodiments, repurposing pin 11 on a SAS or SATA drive may include adding commands to the SAS or SATA command set to query the drive 200 for its status. Furthermore, pin 11 may be repurposed such that it may be asserted by other IHS subsystems to provide other notifications such as, for example, thermal threshold notifications. While the discussion above is directed to the repurposing of pin 11 of SAS or SATA drives, one of skill in the art will understand that it may apply to any drive type. Furthermore, one of skill in the art will recognize that a pin may specifically provided on the connector member 208 of the drive 200 as the vibration notification pin, or any pin on the connector member 208 of the drive 200 may be repurposed to provide the vibration notification pin.

Figure 3:
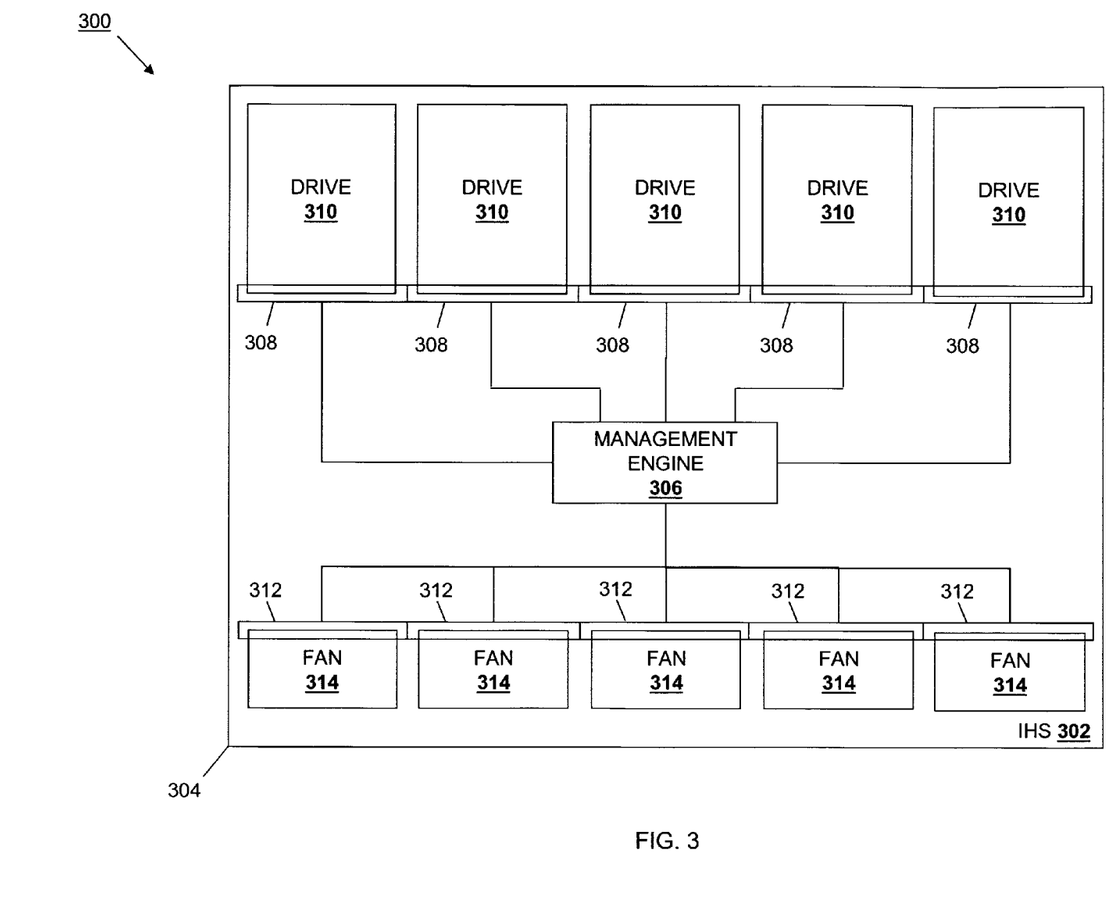
FIG. 3 is a schematic view illustrating an embodiment of a drive vibration prevention system.

Referring now to FIG. 3, an embodiment of a drive vibration prevention system 300 is illustrated. The drive vibration prevention system 300 includes an IHS 302. In an embodiment, the IHS 302 may be the IHS 100, discussed above with reference to FIG. 1, and may include some or all of the components of the IHS 100. In the illustrated embodiment, the IHS 302 includes an IHS chassis 304, but one of skill in the art will recognize that the components of the IHS 302 may be included across a plurality of chassis without departing from the scope of the present disclosure. A management engine 306 is included in the IHS 302. In an embodiment, the IHS 302 includes a computer-readable medium (e.g., the memory 114, the storage device 108, etc.) having computer-readable instructions that, when executed by a processor (e.g., the processor 102), cause the processor to provide the management engine 306 having the functionality discussed below. The management engine 306 is coupled to a plurality of drive connectors 308, and a drive 310 is coupled to each drive connector 308. In an embodiment, the drives 308 may be substantially similar to the drive 200, discussed above with reference to FIG. 2. In an embodiment, each of the drive connectors 308 includes a plurality of pin connections (not illustrated) that engage the pins (e.g., pins 208a, 208b, and 208c are examples) on the connection member 208 of the drive 200. Thus, each drive connector 308 includes a vibration notification pin connection that is coupled the vibration notification pin on each connection member 208 of a drive 200/310. The management engine 306 is also coupled to a plurality of fan connectors 312, and a fan 314 is coupled to each fan connector 312.

While the embodiment of the drive vibration prevention system 300 is illustrated as including 5 drives, one of skill in the art will recognize that the drive vibration prevention system may include only 1 drive or any plurality of drives (e.g., systems with 120 drives or more are known in the art). Furthermore, while the drive vibration prevention system 300 is illustrated as including 5 fans, one of skill in the art will recognize that the drive vibration prevention system 300 may include any plurality of fans.

Figure 4:
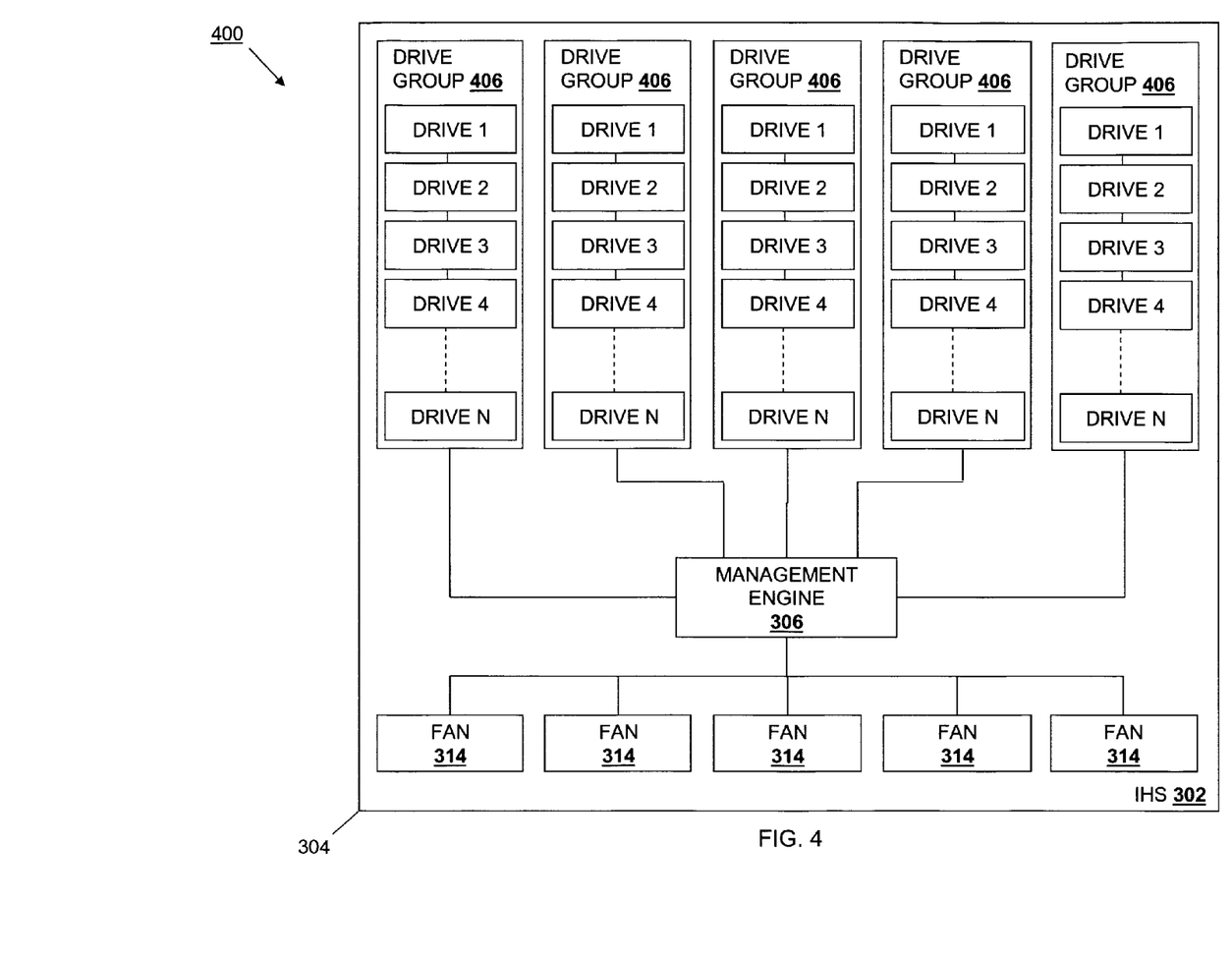
FIG. 4 is a schematic view illustrating an embodiment of a drive vibration prevention system.

For example, referring now to FIG. 4, an embodiment of a drive vibration prevention system 400 is illustrated. The drive vibration prevention system 400 is substantially similar to the drive vibration prevention system 300, discussed above with reference to FIG. 3, but with the provision of a plurality of drive groups 406. Thus drive vibration prevention system 400 includes the IHS 302, the management engine 306, and the fans 314 (coupled to the fan connectors 312 (not illustrated in FIG. 4) discussed with reference to FIG. 3. Furthermore, the management engine 306 is coupled to a plurality of drive connectors (not illustrated), and a drive is coupled to each drive connector, substantially similarly to the drive connectors 308 and drives 310 discussed above with reference to FIG. 3. However, the drive vibration prevention system 400 illustrates a situation where the number of drives in the drive vibration prevention system 400 is relatively large, and subsets of the plurality of drives have been separated into a plurality of drive groups 406, each including any number of drives 1, 2, 3, 4 . . . N. In an embodiment, the outputs of the vibration notification pins for the drives in a drive group 406 may be combined (e.g., logically OR'd together) such that a single vibration notification signal may be provided from each drive group 406 for monitoring by the management engine 306, discussed in further detail below. Combining the outputs of the vibration notification pins on a plurality of drives may simplify the electrical implementation and reduce the cost of the system of the present disclosure.

Figure 5:
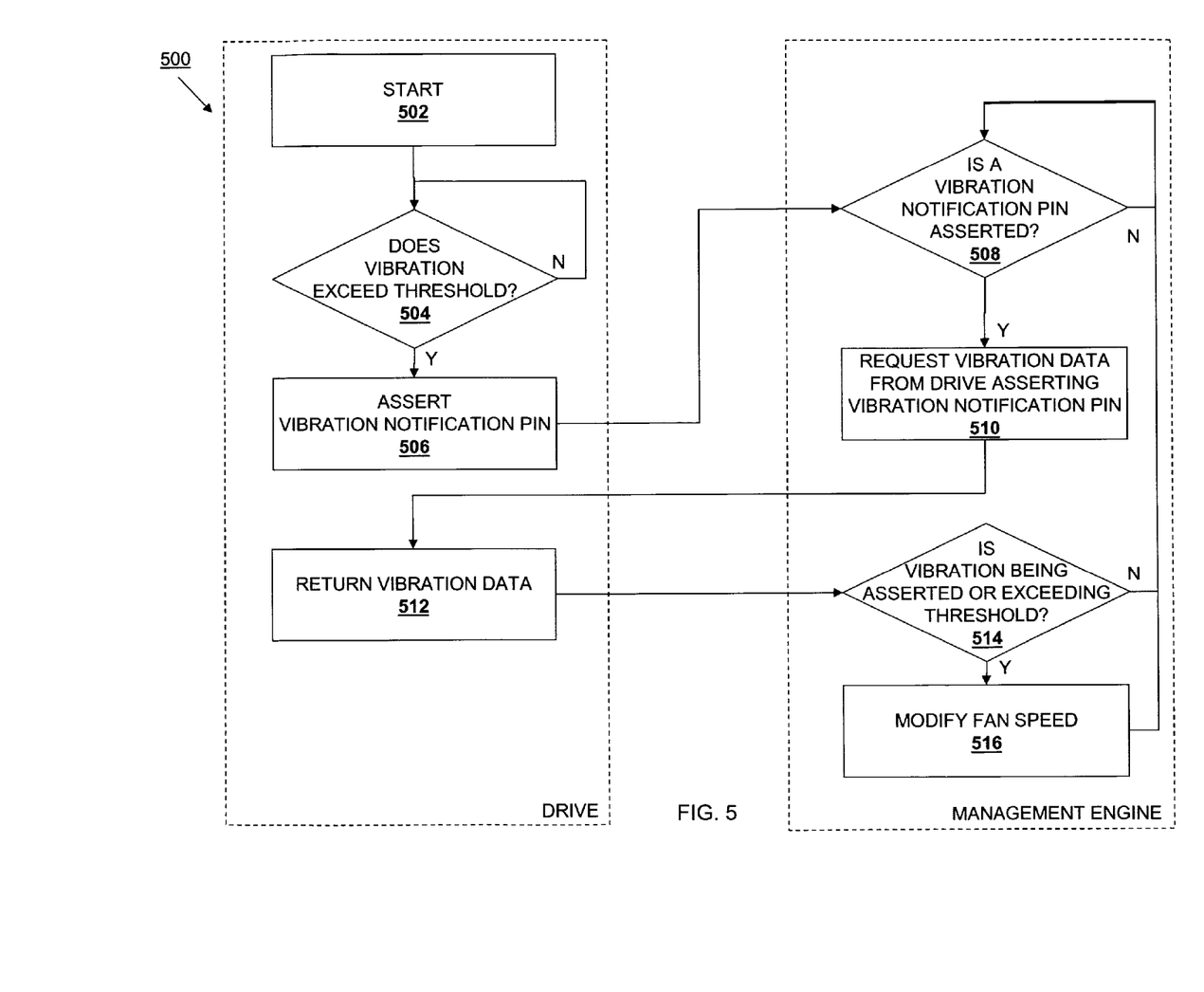
FIG. 5 is a flow chart illustrating an embodiment of a method for preventing vibration in a drive.

Referring now to FIG. 5, an embodiment of a method 500 for preventing drive vibration is illustrated. The method 500 is illustrated and described below as including flows performed by a drive and a management engine. In an embodiment, the blocks performed by the drive may be performed by any of the drives in the drive vibration prevention systems 300 and 400, and the blocks performed by the management engine may be performed by the management engine 306 in the drive vibration prevention systems 300 and 400. One of skill in the art will recognize that any of the blocks of the method 500 may be performed using other components of the drive vibration prevention systems 300 and 400 as well. The method 500 begins at block 502 where the system is started. In an embodiment, at block 502 of the method 500, the IHS 100 or 302 may be powered-on or reset such that the drive is powered and initialized, if necessary.

The method 500 then proceeds to decision block 504 where the drive determines whether a vibration is occurring that exceeds a predetermined threshold. For example, using the drive 200 described above with reference to FIG. 2, the vibration detection device 212 may measure the vibration experienced by the drive 200 and compare that measured vibration to a predetermined threshold stored in a memory. Predetermined threshold vibrations may include any vibration level that could cause the drive head in the drive to track poorly (e.g., become misaligned with the data track), engage the drive platter, and/or a variety of other high vibration disadvantages known in the art. If at decision block 504, the drive determines that there are no vibrations occurring that exceed the predetermined threshold, the method returns to decision block 504 to continue monitoring vibrations experienced by the drive.

If, at decision block 506, the drive determines that there are vibrations occurring that exceed the predetermined threshold, the method 500 proceeds to block 506 where a vibration notification pin is asserted. For example, using the drive 200 described above with reference to FIG. 2, the vibration detection device 212 may determine that the vibration experienced by the drive 200 exceeds the predetermined threshold and, in response, the vibration detection device 212 and/or another drive subsystem may assert the pin 208b. For example, some SAS/SATA drives may include a vibration detection device for the SAS/SATA drive's internal use. As discussed herein, that vibration detection device may be connected to an external GPIO pin for out of band notification to the management engine of a vibration issue with the drive.

The method 500 then proceeds to decision block 508 where the management engine determines whether a vibration notification pin is being asserted. For example, in the drive vibration prevention system 300, at decision block 508 the management engine 306 may poll the vibration notification pin on each of the drives 310 to determine whether one of the drives 310 has asserted its vibration notification pin. In another example, in the drive vibration prevention system 400, at decision block 508 the management engine 306 may determine whether any of the drive groups 406 is providing a vibration notification signal (e.g., if the drives in a drive group 406 have had their vibration notification pins logically OR'd together as discussed above, the management engine 306 may poll the output of that logical OR circuit.) One of skill in the art will recognize that continually polling each drive for its vibration status may reduce data throughput. Thus, in some embodiments, the above described out-of-band method of notifying the management engine that problematic vibrations are occurring in a drive provides for vibration prevention without decreased data throughput. If the management engine determines that no vibration notification pin has been asserted at block 508, the method 500 returns to block 508 to monitor whether a vibration notification pin is being asserted.

If, at decision block 508, the management engine determines that a vibration notification pin is being asserted, the method 500 proceeds to block 510 where the management engine requests vibration data from the drive asserting its vibration notification pin. For example, in the drive vibration prevention system 300, at block 510 the management engine 306 may send a request for vibration data to the drive 310 that was determined to have asserted its vibration notification pin at decision block 508. In another example, in the drive vibration prevention system 400, at block 510 the management engine 306 may request vibration data from each of the drives in the drive group 406 that was determined to have provided the single vibration notification signal at decision block 508. In some embodiments, a command may be added to the SAS/SATA command set so that the management engine may query the drive for its vibration status. For example, some SAS/SATA drives may include a vibration detection device for the SAS/SATA drive's internal use, and by adding the command to the SAS/SATA command set, the system and method of the present disclosure is enabled.

The method 500 then proceeds to block 512 where the drive or drives that received the request in block 510 return vibration data. For example, in the drive vibration prevention system 300, at block 512 the drive 310 that received the request for vibration data at block 510 returns vibration data to the management engine 306. In another example, in the drive vibration prevention system 400, at block 512 each of the drives in the drive group 406 that received the request for vibration data at block 510 returns vibration data to the management engine 306. In some embodiments, vibration data may simply include a flag that indicates that the measured vibration has exceeded a predetermined level. Thus, in some embodiments, blocks 510, 512, and 514 of the method 500 may be skipped, as the determination by the management engine 306 that a drive is asserting its vibration notification pin will indicate to the management engine 306 that a measured vibration in that drive has exceeded the predetermined threshold, and the management engine may then proceed immediately to block 516 to modify fan speed, discussed in further detail below. In other embodiments, the pin on the connection member 208 of the drive that is used for vibration notification may have multiple purposes (e.g., it may provide for other alerts such as, for example, thermal status alerts), and thus a determination that this pin is asserted will require the management engine to determine why it has been asserted. In an embodiment, vibration data from a drive may include data collected by the vibration detection device 212 about the length, intensity, and/or other attributes of the measured vibration. For example, the vibration detection device 212 may store any vibration data collected in a memory, and in response to a request for vibration data from the management engine, provide that vibration data to the management engine.

The method 500 then proceeds to decision block 514 where the management engine determines whether excessive vibration is being asserted or is exceeding a predetermined threshold. As discussed above, in some embodiments, the drive(s) may return a flag that indicates that the measured vibration has exceeded a predetermined level, while in other embodiments, the drive(s) may return data collected that includes attributes of the measured vibration. If, at decision block 514, the management engine determines that no drive or drives returned a flag that indicates that the measured vibration has exceeded a predetermined level and/or that no vibration data collected from the drives or drives indicates that the vibrations in the drive or drives is exceeding a predetermined threshold, the method 500 proceeds back to decision block 508 where the management engine continues to monitor whether a vibration notification pin is being asserted.

If, at decision block 514, the management engine determines that a drive or drives returned a flag that indicates that the measured vibration has exceeded a predetermined level and/or that vibration data collected from the drives or drives indicates that the vibrations in the drive or drives is exceeding a predetermined threshold, the method 500 proceeds to block 516 where fan speed is increased. For example, in the drive vibration prevention systems 300 or 400, the management engine 306 may provide a signal through the fan connectors 312 that causes at least one of the fans 314 to modify its speed (e.g., its fan rotations per minute (RPMs)). Modification of the speed of the fans may include increases or decreases in fan speeds. The modification of the speed of one or more fans is provided by the management engine in order to cause the speed of the one or more fans to pass through a subset of fan speeds that are resulting in the vibrations that causes the drive or drives to assert their vibration notification pins in block 506 of the method 500. In an embodiment, the fan speed or speeds may be increased until the vibration frequency shifts to a point that it is not longer problematic for the drive. In an embodiment, the management engine may continually monitor the vibration notification pins on the drives and/or request vibration data from the drive or drives during the modification of the fan speed in block 518 in order to determine whether the vibration experienced by the drive or drives has fallen below the predetermined threshold. In an embodiment, a determination that the vibration experienced by the drive or drives has fallen below the predetermined threshold may cause the management engine to stop modifying the fan speed any further. One of skill in the art will recognize that the method 500 may be performed until all drives in the drive vibration prevention system are not experiencing problematic vibrations (e.g., no vibration notification pins in the drive vibration prevention system are being asserted.) The method 500 then proceeds back to decision block 508 where the management engine continues to monitor whether a vibration notification pin is being asserted.

In an embodiment, the management engine may store information collected during the method 500 in a database and use the information to control fan speeds during future operation of the drive vibration prevention system. For example, as a result of performing the method 500 one or more times, the management engine may store in a database a plurality of fan speeds or fan speed ranges at which the drives in the IHS experience vibrations that exceed a predetermined threshold. That database may then be referenced during future operation of the IHS in order to avoid stored fan speeds or fan speed ranges. Thus, the drive vibration prevention system may operate to create "notched" fan speed curves "on-the-fly", rather than in laboratory environments, for any system in which it is included. One of skill in the art will appreciate that this allows for the elimination of IHS vibration testing, and IHS's may simply be built and run in order to develop and use the "notched" fan speed curve. Furthermore, for systems that use these "notched" fan speed curves created "on-the-fly" and stored in a database, the drive vibration prevention system may be periodically used to determine whether the problematic fan speeds or fan speed ranges have changed due to IHS changes and, if so, modify those fan speeds or fan speed ranges in the database. It has been found that such systems provide "notched" fan speed curves that "notch", or avoid, much smaller fan speed ranges than are provided using conventional systems, as the "notched" fan speed curve is "tuned" to the specific IHS and its environment.

Thus, a system and method are provided that is able to monitor one or more drives for problematic vibrations and, in response to detecting problematic vibrations, modify fan speeds to prevent those problematic vibrations from occurring. Some embodiments of the system may use out-of-band communications to conduct the monitoring such that drive storage traffic is not interrupted or slowed down, and the results of the method may be saved for use in future operation of the system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A drive vibration prevention system, comprising:
a fan connector that is configured to connect to a fan;
a drive connector;
a drive that houses a vibration detection device and that is connected to the drive connector by a drive activity pin that is included on the drive, wherein the drive includes modified firmware that repurposes the drive activity pin to provide vibration notifications in response to detected vibrations by the vibration detection device; and
a management engine that is coupled to the drive connector and the fan connector, wherein the management engine is configured to:
determine that the drive activity pin is being asserted by the drive to provide an out-of-band vibration notification;

retrieve vibration data from the drive through the drive connector in response to determining that the drive activity pin is being asserted by the drive to provide the vibration notification; and provide a signal through the fan connector for modifying a fan speed based on the vibration data.

2. The system of claim 1, wherein the assertion of the drive activity pin by the drive to provide the out-of-band vibration notification to the management engine does not affect a data throughput of the drive.

3. The system of claim 1, wherein the management engine includes a modified command set that is configured to request a status of the drive.

4. The system of claim 1, wherein the drive is configured to assert the drive activity pin in response to the vibration detection device detecting a vibration that exceeds a predetermined threshold.

5. The system of claim 1, wherein the drive is configured to provide the vibration data to the management engine from the vibration detection device in response to a request.

6. The system of claim 1, further comprising:
a fan connected to the fan connector and configured to operate at a plurality of different fan speeds.

7. The system of claim 6, wherein the signal for modifying the fan speed based on the vibration data is selected such that the speed of the fan is either increased or decreased past a subset of the plurality of different fan speeds that result in vibrations in the drive that exceed a predetermined threshold.

8. An information handling system (IHS), comprising:
a chassis;
a plurality of fans located in the chassis;
a plurality of drives located in the chassis, wherein at least one of the plurality of drives houses a vibration detection device and provides a drive activity pin that is coupled to the vibration detection device, wherein the at least one of the plurality of drives includes modified firmware that repurposes the drive activity pin to provide vibration notifications in response to detected vibrations by the vibration detection device;
a processor located in the chassis and coupled to the plurality of fans and the plurality of drives; and
a computer-readable medium located in the chassis and coupled to the processor, the computer-readable medium comprising instruction that, when executed by the processor, cause the processor to provide a management engine that is configured to:
determine that the at least one of the plurality of drives is asserting the drive activity pin to provide an out-of-band vibration notification and, in response, retrieve vibration data from the at least one of the plurality of drives; and
modify a speed of at least one fan of the plurality of fans based on the vibration data.

9. The IHS of claim 8, wherein the assertion of the drive activity pin by the at least one of the plurality of drives to provide the out-of-band vibration notification to the management engine does not affect a data throughput of the at least one of the plurality of the drives.

10. The IHS of claim 8, wherein each of the plurality of drives is configured to assert its drive activity pin in response to a vibration detection device in that drive detecting a vibration that exceeds a predetermined threshold.

11. The IHS of claim 9, wherein each of the plurality of drives is configured to provide the vibration data to the management engine from a vibration detection device in that drive in response to a request.

12. The IHS of claim 8, wherein the speed of the at least one fan is modified based on the vibration data such that the speed of the at least one fan is either increased or decreased past a subset of fan speeds that result in vibrations in the at least one drive that exceed a predetermined threshold.

13. The IHS of claim 8, wherein a vibration notification signal is provided to the management engine in response to any one of the plurality of drives asserting its drive activity pin, and in response to receiving the vibration notification signal, the management engine is configured to retrieve vibration data from each of the plurality of drives.

14. The IHS of claim 8, wherein the plurality of drives are separated into a plurality of drive groups that each include a subset of the plurality of drives, and wherein a vibration notification signal is provided to the management engine in response to any one of the plurality of drives asserting its drive activity pin, and wherein in response to receiving a vibration notification signal from a drive group, the management engine is configured to retrieve vibration data from each of the drives in the subset of drives for that drive group.

15. A method for preventing vibration in a drive, comprising:
asserting a drive activity pin provided on at least one drive using modified firmware in the at least one drive that repurposes the drive activity pin to provide an out-of-band vibration notification in response to detected vibration by a vibration detection device in the at least one drive;
determining, by a management system that is connected to the at least one drive, that the drive activity pin on the at least one drive is being asserted;
retrieving, by the management system, vibration data from the at least one drive in response to determining that the drive activity pin is being asserted by the at least one drive to provide the out-of-band vibration notification; and
modifying, by the management system, a fan speed based on the vibration data.

16. The method of claim 15, further comprising:
detecting a vibration in the at least one drive that exceeds a predetermined threshold and, in response, asserting the drive activity pin.

17. The method of claim 15, wherein the modifying the fan speed using the vibration data includes either increasing or decreasing the speed of a fan past a subset of fan speeds that result in vibrations in the at least one drive that exceed a predetermined threshold.

18. The method of claim 15, wherein a vibration notification signal is received in response to any one of a plurality of drives asserting a drive activity pin included on that drive, and wherein in response to receiving the vibration notification signal, the method further comprises:
retrieving vibration data from each of the plurality of drives.

19. The method of claim 15, wherein a plurality of drives are separated into a plurality of drive groups that each include a subset of the plurality of drives, and wherein a vibration notification signal is provided to the management engine in response to any one of the plurality of drives in a drive group asserting a drive activity pin included on that drive, and wherein in response to receiving a vibration notification signal from a drive group, the method further comprises:
retrieving vibration data from each of the drives in the subset of drives for the drive group from which the vibration notification signal was received.

20. The method of claim 15, wherein the assertion of the drive activity pin by the at least one drive to provide the out-of-band vibration notification does not affect a data throughput of the at least one drive.

* * * * *